United States Patent
Mishima et al.

(10) Patent No.: US 8,474,731 B2
(45) Date of Patent: Jul. 2, 2013

(54) REDUCED WATER MIST GENERATOR AND METHOD OF PRODUCING REDUCED WATER MIST

(75) Inventors: Yukiko Mishima, Takatsuki (JP); Junpei Ohe, Hirakata (JP); Hiroshi Suda, Takatsuki (JP); Yukiyasu Asano, Kobe (JP); Tomohiro Yamaguchi, Moriyama (JP); Yasuhiro Komura, Shijonawate (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 13/120,006

(22) PCT Filed: Sep. 29, 2009

(86) PCT No.: PCT/JP2009/067312
§ 371 (c)(1),
(2), (4) Date: Mar. 21, 2011

(87) PCT Pub. No.: WO2010/038891
PCT Pub. Date: Apr. 8, 2010

(65) Prior Publication Data
US 2011/0168798 A1 Jul. 14, 2011

(30) Foreign Application Priority Data
Sep. 30, 2008 (JP) ................................. 2008-254969

(51) Int. Cl.
B05B 5/025 (2006.01)
B05B 5/057 (2006.01)
B05B 5/035 (2006.01)
B05B 5/16 (2006.01)
B05B 5/00 (2006.01)

(52) U.S. Cl.
USPC .............................................. 239/3; 239/690

(58) Field of Classification Search
USPC ....................... 239/3, 690, 697, 698, 706, 707
See application file for complete search history.

(56) References Cited

U.S. PATENT DOCUMENTS

2006/0131449 A1* 6/2006 Azukizawa et al. ........ 239/690.1
2006/0144971 A1* 7/2006 Nakada et al. ................ 239/690

(Continued)

FOREIGN PATENT DOCUMENTS

EP 1 666 156 A1 6/2006
EP 1 700 637 A1 9/2006

(Continued)

OTHER PUBLICATIONS

Japan Office action, mail date is Nov. 20, 2012.

(Continued)

*Primary Examiner* — Darren W Gorman
(74) *Attorney, Agent, or Firm* — Greenblum & Bernstein P.L.C.

(57) ABSTRACT

A reduced water mist generator, including: a water supply member that supplies water; a high voltage application member that applies a high voltage; and a discharge electrode that is constituted by a metal element that produces molecular hydrogen by a chemical reaction with nitric acid molecules, the discharge electrode being provided with an electrostatic atomizing function that, when a high voltage is applied by the high voltage application member while water is supplied by the water supply member, generates an electric field and thereby electrostatically atomizes the water supplied from the water supply member to produce microparticulated water, and also being provided with a hydrogen molecule generating function that produces the molecular hydrogen by a chemical reaction with nitric acid molecules generated when the water is electrostatically atomized, the discharge electrode generating a hydrogen water mist in the form of a reduced water that contains the molecular hydrogen in the microparticulated water.

11 Claims, 5 Drawing Sheets

U.S. PATENT DOCUMENTS

| | | | |
|---|---|---|---|
| 2006/0214020 A1* | 9/2006 | Suda et al. | 239/3 |
| 2007/0119993 A1 | 5/2007 | Yamaguchi et al. | |
| 2008/0130189 A1* | 6/2008 | Kobayashi et al. | 361/228 |
| 2009/0001200 A1* | 1/2009 | Imahori et al. | 239/700 |
| 2009/0114747 A1* | 5/2009 | Nakada et al. | 239/708 |
| 2010/0133367 A1* | 6/2010 | Yano et al. | 239/700 |

FOREIGN PATENT DOCUMENTS

| | | |
|---|---|---|
| JP | 2005-66586 | 3/2005 |
| JP | 2005-105289 A | 4/2005 |
| JP | 2006-095502 A | 4/2006 |
| JP | 2006-198502 | 8/2006 |
| JP | 2007-402 A | 1/2007 |
| JP | 2007-167758 A | 7/2007 |

OTHER PUBLICATIONS

U.S. Appl. No. 13/061,845 to Tomohiro Yamaguchi et al., which was filed on Mar. 2, 2011.

* cited by examiner

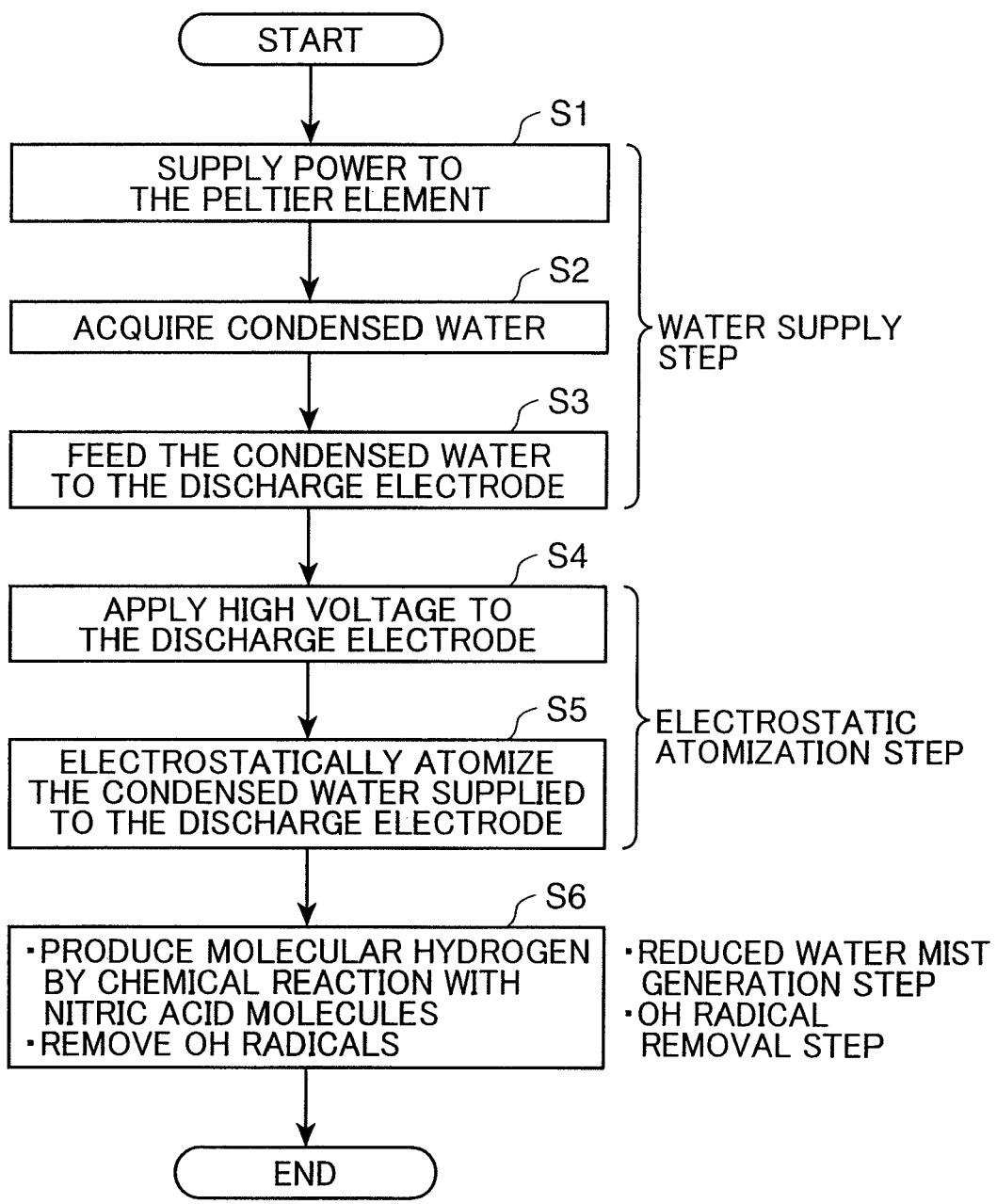

REDUCED WATER MIST GENERATOR AND METHOD OF PRODUCING REDUCED WATER MIST

TECHNICAL FIELD

The present invention relates to a reduced water mist generator and a method of producing a reduced water mist.

BACKGROUND ART

Hydrogen water is being used for skin and hair antioxidation, for the storage of food products, to prevent metal rusting, and so forth.

A hydrogen water supply apparatus that can produce this type of hydrogen water is provided in Patent Document 1. In this type of hydrogen water supply apparatus, a portion of the water to be supplied for a dwelling is introduced into an electrolyzer tank disposed outside the dwelling to produce water that contains hydrogen gas and oxygen gas. This hydrogen gas- and oxygen gas-containing water is then supplied to the dwelling mixed with the water supply for the dwelling.

This type of hydrogen water supply apparatus supplies a dwelling with hydrogen gas- and oxygen gas-containing water mixed with the water supply for the dwelling. However, for skin and hair antioxidation, food product storage, or the prevention of metal rusting, it is desirable to generate the hydrogen water in mist form evenly over the target article.

CITATION LIST

Patent Document 1: Japanese Patent Application Laid-open No. 2005-105289

SUMMARY OF THE INVENTION

An object of the present invention is to provide a reduced water mist generator and a method of producing a reduced water mist, that can produce a hydrogen water mist in the form of a reduced water mist.

The reduced water mist generator according to one aspect of the present invention comprises: a water supply member that supplies water;
a high voltage application member that applies a high voltage; and
a discharge electrode that is constituted by a metal element that produces molecular hydrogen by a chemical reaction with nitric acid molecules, the discharge electrode being provided with an electrostatic atomizing function that, when a high voltage is applied by the high voltage application member while water is supplied by the water supply member, generates an electric field and thereby electrostatically atomizes the water supplied from the water supply member to produce microparticulated water, and also being provided with a hydrogen molecule generating function that produces the molecular hydrogen by a chemical reaction with nitric acid molecules generated when the water is electrostatically atomized, the discharge electrode generating a hydrogen water mist in the form of a reduced water mist that contains the molecular hydrogen in the microparticulated water.

When high voltage is applied to the discharge electrode in this structure, the discharge electrode generates an electric field, thereby electrostatically atomizing water supplied from the water supply member and producing water in a microparticulated state. In addition, molecular hydrogen is produced by the chemical reaction of the discharge electrode with nitric acid molecules produced when a portion of the electrostatically atomized water incorporates atmospheric nitrogen during the electrostatic atomization of the water. This results in the production of a hydrogen water mist in the form of a mist that contains large amounts of molecular hydrogen in microparticulated water.

As a consequence, a hydrogen water mist containing large amounts of molecular hydrogen can be produced, as a reduced water mist, by the reduced water mist generator from water using a simple structure. This hydrogen water mist can impart an efficient antioxidative effect to all types of target articles, e.g., human skin and hair, food products, metals, and so forth.

BRIEF DESCRIPTION OF THE DRAWINGS

FIG. 7 is a flow chart that provides a summary of the method of producing a reduced water mist according to an embodiment of the present invention.

DESCRIPTION OF EMBODIMENTS

The reduced water mist generator and the method of producing a reduced water mist are described in the following with reference to an embodiment of the present invention.

Figure 1:
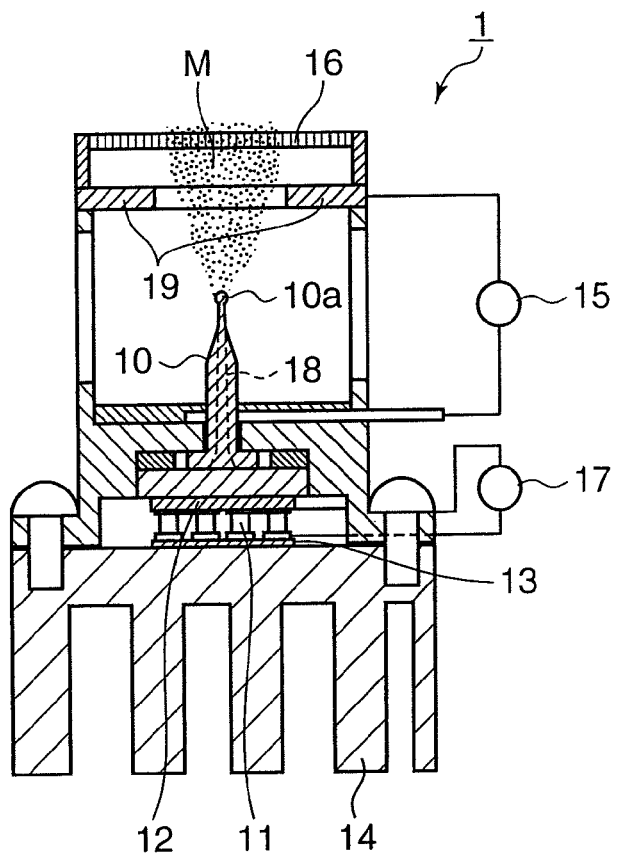
FIG. 1 is a drawing that shows an example of the structure of the essential elements of a reduced water mist generator according to an embodiment of the present invention.
Figure 2:
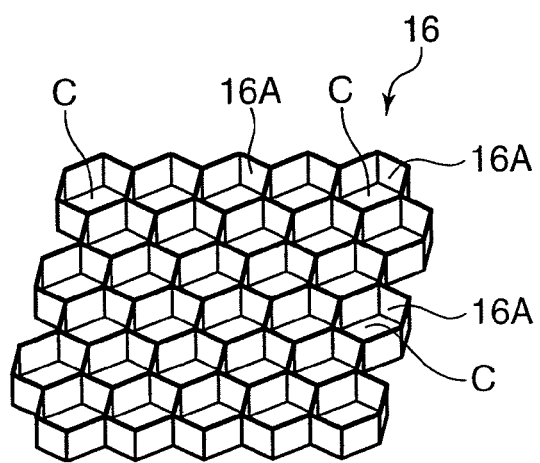
FIG. 2 is an oblique drawing that shows an example of the structure of a metal mesh.
Figure 3:
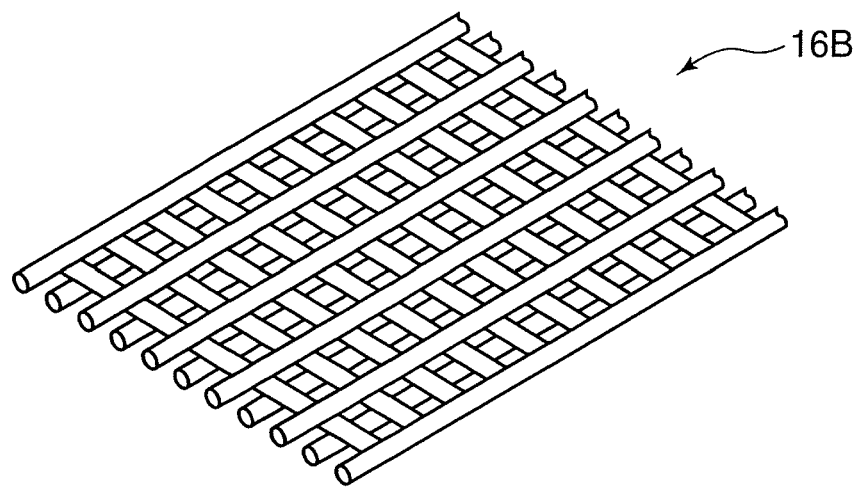
FIG. 3 shows another example of the structure of a metal mesh.
Figure 4:
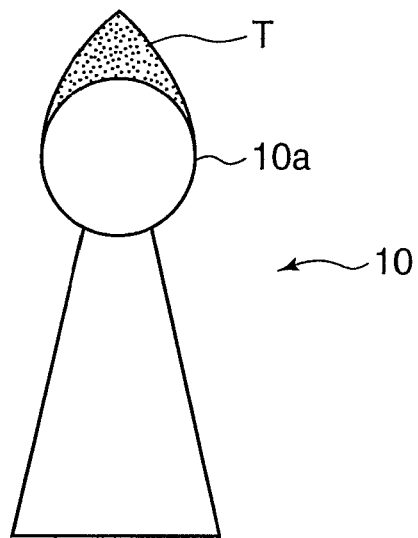
FIG. 4 is a drawing for describing a Taylor cone.

The drawing in FIG. 1 shows an example of the structure of the essential elements of a reduced water mist generator according to an embodiment of the present invention. An oblique drawing that shows an example of the structure of a metal mesh is shown in FIG. 2. An oblique drawing that shows another example of the structure of a metal mesh is shown in FIG. 3. FIG. 4 is a drawing for describing a Taylor cone.

The reduced water mist generator 1 shown in FIG. 1 is an apparatus that can produce a hydrogen water mist in mist form as the reduced water mist M. This reduced water mist generator 1 is provided with a discharge electrode 10 that has a water feed conduit 18; a Peltier element (water supply member) 11 that has a cooling side 12 and a heat dissipating side 13; a heat dissipating fin 14; a high voltage application member 15; a metal mesh (OH radical removal member) 16; a power source 17 for the Peltier element; and a counterelectrode 19.

The discharge electrode 10 in this reduced water mist generator 1 is constituted by a metal element that generates molecular hydrogen ($H_2$) by a chemical reaction with the nitric acid molecule ($HNO_3$). This metal element is preferably a metal element that has a higher ionization tendency than hydrogen (H). The reason for this is that a metal element that has a higher ionization tendency than hydrogen can readily undergo a chemical reaction with the nitric acid molecule to produce molecular hydrogen.

Various metal elements exist that have a higher ionization tendency than hydrogen and can readily undergo a chemical reaction with the nitric acid molecule to produce molecular hydrogen. However, zinc (Zn) is preferred for this metal element. This is because zinc, unlike elements such as aluminum (Al), does not produce a nonconductor upon its chemical reaction with the nitric acid molecule.

The discharge electrode 10 exhibits a taper in the direction of the tip 10a. When the tip 10a has a tapered shape, the electric field produced at the tip 10a of the discharge electrode 10 has a high field density, which results in the production of a stabilized Taylor cone, vide infra.

The water feed conduit 18 is disposed at the discharge electrode 10 so as to feed condensed water, which has been produced at the cooling side 12 of the Peltier element 11, to the tip 10a of the discharge electrode 10. While various methods can be envisaged by which this water feed conduit 18 can supply the condensed water to the tip 10a of the discharge electrode 10, the water feed conduit 18 is preferably formed as a capillary conduit because this enables the condensed water to be supplied to the tip 10a of the discharge electrode 10 without using a pumping means such as a pump.

The cooling side 12 of the Peltier element 11 is cooled when the Peltier element 11 is energized by the power source 17 for the Peltier element. As a result, the moisture present in the air around the cooling side 12 is condensed at the surface of the cooling side 12 and is thereby converted into condensed water. Heat is produced from the heat dissipating side 13 of the Peltier element 11, and this heat is radiated off by the heat dissipating fin 14.

In the embodiment under consideration, the water supply member is formed by the Peltier element 11, but it may also be formed by, for example, a heat exchanger, an adsorbent such as zeolite, and so forth. Another example is a structure in which the water is supplied manually.

The condensed water produced by the Peltier element 11 at its cooling side 12 is drawn up through the water feed conduit 18 by, for example, capillary phenomena, and reaches the tip 10a of the discharge electrode 10.

A high voltage application member 15 is connected to the discharge electrode 10 and the counterelectrode 19, and applies high voltage to the discharge electrode 10 and the counterelectrode 19, thereby producing an electric field between the discharge electrode 10 and the counterelectrode 19. As a result, the water supplied to the discharge electrode 10 is electrostatically atomized at the tip 10a to produce water in a microparticulated state. This microparticulated water is guided toward the counterelectrode 19 by the Coulombic force described below.

A metal mesh 16 is disposed downstream from the counterelectrode 19 along the direction of production of the OH radicals that are produced from the discharge electrode 10 (above the counterelectrode 19 in FIG. 1). The reason for this is as follows: when the discharge electrode 10 engages in the electrostatic atomization of the water, OH radicals are produced in the direction of the counterelectrode 19 from a portion of the electrostatically atomized water, and, given the goal of antioxidation, it then becomes necessary to remove the OH radicals that pass through the counterelectrode 19.

This metal mesh 16 is constructed of a stainless material elaborated as a honeycomb structure. As shown in FIG. 2, the metal mesh 16 is composed of a stainless material and is built up by the aggregation in a beehive shape of a plurality of hexagonal cylinders 16A each having a cavity C. Because this metal mesh 16 is formed of a stainless material elaborated as a honeycomb structure, the metal mesh 16 secures a large contact area for contacting the OH radical that is to be removed. As a consequence, large amounts of OH radical can be removed by the reduced water mist generator 1.

A metal mesh 16B formed of a stainless material mesh, as shown in FIG. 3, may also be employed. The metal mesh 16B formed of a stainless material mesh also secures a large contact area for contacting the OH radical that is to be removed and as a consequence can efficiently remove the OH radical.

As shown in FIG. 1, the counterelectrode 19 is disposed so as to form a pair with the discharge electrode 10. Because the counterelectrode 19 forms a pair with the discharge electrode 10 in this manner, the application of high voltage to the discharge electrode 10 and the counterelectrode 19 results in the generation of Coulombic force between the counterelectrode 19 and the water fed to the discharge electrode 10. Due to this, the water fed to the discharge electrode 10 in the reduced water mist generator 1 can be efficiently electrostatically atomized and converted into microparticulated water by the electric field produced between the counterelectrode 19 and the water fed to the discharge electrode 10. When electrostatic atomization can be carried out efficiently, the amount of microparticulated water is increased and because of this the amount of water that forms the nitric acid molecule by the intake of atmospheric molecular nitrogen also undergoes a proportional increase. The reduced water mist generator 1 is therefore able to generate the nitric acid molecule in large amounts. Molecular hydrogen can then be generated in large amounts since the nitric acid molecules generated in large amounts can chemically react with the discharge electrode 10.

As a result, the reduced water mist generator 1 can produce, as the reduced water mist M, a hydrogen water mist comprising molecular hydrogen present in large amounts in microparticulated water.

When the Peltier element 11 is energized in the reduced water mist generator 1, the cooling effect due to the cooling side 12 of the Peltier element 11 results in the conversion at the cooling side 12 of the moisture in the air surrounding the cooling side 12 into condensed water (referred to simply as "water" in the following). This water passes through the water feed conduit 18 as a result, for example, of capillary phenomena, and is fed to the tip 10a of the discharge electrode 10.

In addition, an electric field is generated between the discharge electrode 10 and the counterelectrode 19 when high voltage is applied to the discharge electrode 10 and the counterelectrode 19 by the high voltage application member 15. The water fed to the tip 10a of the discharge electrode 10 also takes on an electrical charge when high voltage is applied to the discharge electrode 10 and the counterelectrode 19.

As a result, Coulombic force acts between the counterelectrode 19 and the water fed to the tip 10a of the discharge electrode 10; this Coulombic force acts in the direction of the counterelectrode 19 causing the liquid surface of the water to well up locally into a cone shape. This region of local upwelling of the liquid surface of the water into a cone shape is a Taylor cone T, shown in FIG. 4. The tip of the Taylor cone T is further charged by the high voltage applied to the discharge electrode 10. As a result, a large Coulombic force is generated toward the counterelectrode 19 at the tip of the Taylor cone T, resulting in growth of the Taylor cone T.

However, when this Taylor cone T grows, electric charge is concentrated at the tip of the Taylor cone T, leading to a high electric charge density. When this occurs, the water at the tip region of the Taylor cone T is subjected to a large amount of energy (repulsive force due to the now high electric charge density). And when the energy subjected to the water at the tip region of the Taylor cone T exceeds the surface tension, fission and dispersion (Rayleigh fission) occur repeatedly.

The outcome is that microparticulated water having a nanometer particle size is produced in large amounts in the direction of the counterelectrode 19.

This function—in which the discharge electrode 10 induces the growth of a Taylor cone T at the tip 10a of the discharge electrode 10 and induces repetitive Rayleigh fission in the water at the tip region of the Taylor cone T to cause the generation of large amounts of microparticulated water in the direction of the counterelectrode 19—is called an electrostatic atomizing function.

When this electrostatic atomizing function is actually in operation, a portion of the water at the tip 10a of the discharge electrode 10 incorporates the molecular nitrogen ($N_2$) in the air to give the nitric acid molecule. The nitric acid molecules thereby produced at the tip 10a of the discharge electrode 10 undergo a chemical reaction with the discharge electrode 10 to produce molecular hydrogen. This function—in which the discharge electrode 10 produces molecular hydrogen by chemically reacting with the nitric acid molecules that have been produced at the tip 10a of the discharge electrode 10—is called a hydrogen molecule generating function.

Figure 5:
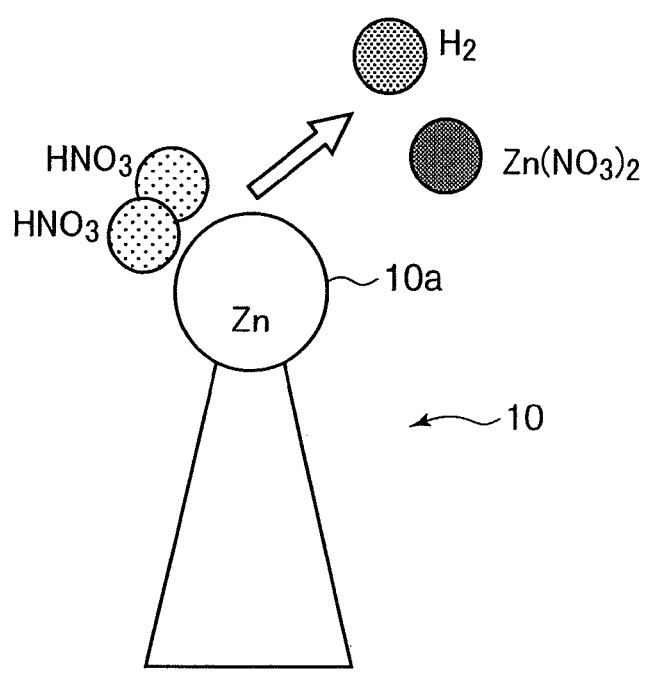
FIG. 5 is a drawing for describing the regime by which molecular hydrogen is produced at the discharge electrode.

The drawing in FIG. 5 provides a description of the regime of molecular hydrogen production at the discharge electrode 10. The discharge electrode 10 in FIG. 5 is constituted of zinc. As a consequence, the nitric acid molecules ($HNO_3$) produced at the tip 10a of the discharge electrode 10 undergo a chemical reaction with the zinc (Zn) constituting the discharge electrode 10 to the production of molecular hydrogen ($H_2$). This chemical reaction is shown by the following chemical reaction formula: $Zn+2(HNO_3) \rightarrow H_2+Zn(NO_3)_2$. This results in the production of molecular hydrogen ($H_2$) at the discharge electrode 10. Since this molecular hydrogen ($H_2$) has a lower specific gravity than air, it is guided in the direction of the counterelectrode 19 (see FIG. 1). The outcome is that microparticulated water containing molecular hydrogen ($H_2$) is generated, as the reduced water mist M, from the discharge electrode 10 in the direction of the counterelectrode 19 (see FIG. 1).

The OH radical with its oxidative activity is, however, produced at the same time that a portion of the electrostatically atomized water is converted, at the tip 10a of the discharge electrode 10, to nitric acid molecules by the incorporation of atmospheric molecular nitrogen. Thus, OH radicals are admixed into the reduced water mist M and are produced in the direction of the counterelectrode 19. However, these OH radicals are removed at the metal mesh 16. The OH radicals are thus removed by oxidation of the metal mesh 16 by the OH radicals.

Even in the absence of the counterelectrode 19, a discharge is produced at the discharge electrode 10 when high voltage is applied to the discharge electrode 10, and the counterelectrode 19 is thus not necessarily indispensable to the reduced water mist generator 1. In this case, microparticulate water disseminates from the discharge electrode 10 toward, for example, the housing (not shown). When in this case a metal mesh 16 is disposed downstream from the discharge electrode 10 along the direction of dissemination of the microparticulated water, microparticulated water that contains large amounts of molecular hydrogen and from which the OH radicals have been removed, is produced as the reduced water mist M downstream from the metal mesh 16 along the direction of microparticulated water dissemination.

Figure 6:
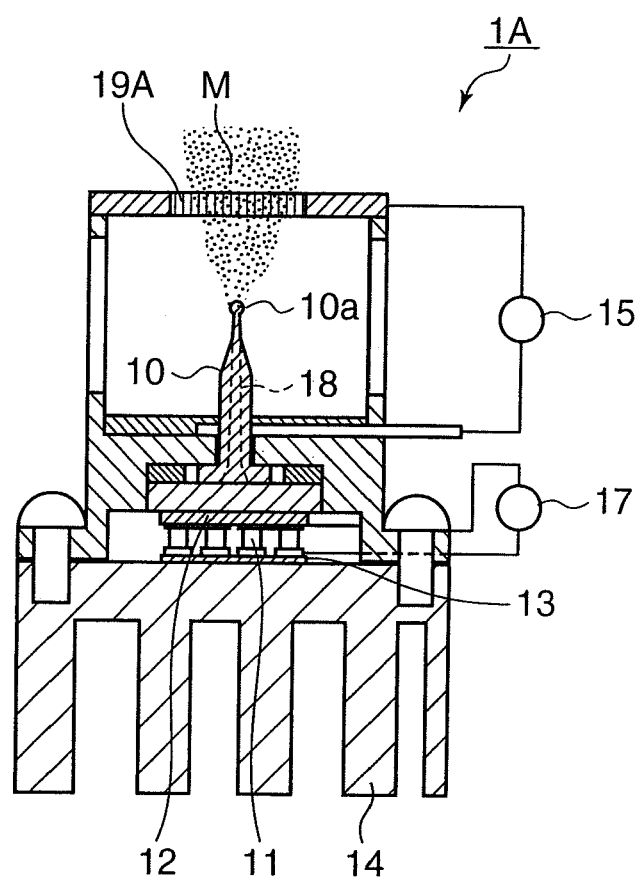
FIG. 6 is a drawing that shows another example of the structure of the essential elements of a reduced water mist generator according to an embodiment of the present invention.

Another example of the essential elements of a reduced water mist generator according to an embodiment of the present invention is shown in FIG. 6. Those features that are the same as in the reduced water generator 1 shown in FIG. 1 have been assigned the same reference symbols in FIG. 6 as in FIG. 1 and their description is also not repeated.

The reduced water mist generator 1A shown in FIG. 6 can produce a hydrogen water mist, as the reduced water mist M, in mist form in the same manner as the reduced water mist generator 1 shown in FIG. 1. In the reduced water mist generator 1A, the counterelectrode 19A, which functions as an OH radical removal member, is disposed downstream along the direction of OH radical production (above the discharge electrode 10 in FIG. 6). This counterelectrode 19A has the same structure as the metal mesh 16 shown in FIG. 2 and the metal mesh 16B shown in FIG. 3.

The OH radicals admixed in the reduced water mist M and generated in the direction of the counterelectrode 19A are removed at this counterelectrode 19A. Since the counterelectrode 19A functions as an OH radical removal member, the reduced water mist generator 1A has the effect of reducing the number of components.

A flow chart that summarizes the method of producing a reduced water mist according to an embodiment of the present invention is shown in FIG. 7. The reduced water mist generators 1 and 1A both produce a hydrogen water mist, as the reduced water mist M, according to the sequence of procedures given by the following step S1 to step S6.

That is, The reduced water mist generators 1 and 1A begin making the Peltier element power supply 17 supply power to the Peltier element 11 (step S1). The reduced water mist generators 1 and 1A are then able to acquire condensed water at the cooling side 12 of the Peltier element 11 (step S2). The reduced water mist generators 1 and 1A draw up the condensed water acquired at the cooling side 12 through the water feed conduit 18 by, for example, capillary phenomena, and feed to the tip 10a of the discharge electrode 10 (step S3).

Then, the reduced water mist generators 1 and 1A make the high voltage application member 15 apply high voltage to the discharge electrode 10 and the counterelectrode 19, and thereby causing the generation of an electric field between the discharge electrode 10 and the counterelectrode 19 (step S4). This brings about electrostatic atomization of the condensed water fed to the tip 10a of the discharge electrode 10 (step S5). As a result, microparticulated water is produced in large amounts from the tip 10a of the discharge electrode 10 in the direction of the counterelectrode 19.

The reduced water mist generators 1 and 1A make the discharge electrode 10 undergo a chemical reaction with nitric acid molecules produced during the aforementioned electrostatic atomization of the condensed water, and thereby causing the production of molecular hydrogen (step S6). This results in the generation in the direction of the counterelectrode 19 of a reduced water mist M, which contains molecular hydrogen in the microparticulated water produced in the process of step S5.

The reduced water mist generators 1 and 1A make the metal mesh 16 remove the OH radicals produced at the same time as the nitric acid molecules (step S6). As a result, the reduced water mist generators 1 and 1A are able to produce, as the reduced water mist M, a hydrogen water mist that has a very low OH radical content.

The reduced water mist generators 1 and 1A according to this embodiment can be built into a variety of articles, for example, shower heads, facial massagers, sauna suits, hair dryers, hair brushes, hair irons and curling irons, air conditioners, sauna equipment, prefabricated bath units, and so forth.

An invention with the following structure is mainly encompassed by the specific embodiment described in the preceding.

The reduced water mist generator according to one aspect of the present invention comprises:

a water supply member that supplies water;

a high voltage application member that applies a high voltage; and a discharge electrode that is constituted by a metal element that produces molecular hydrogen by a chemical reaction with nitric acid molecules, the discharge electrode being provided with an electrostatic atomizing function that, when a high voltage is applied by the high voltage application member while water is supplied by the water supply member, generates an electric field and thereby electrostatically atomizes the water supplied from the water supply member to produce microparticulated water, and also being provided with a hydrogen molecule generating function that produces the aforementioned molecular hydrogen by a chemical reaction with nitric acid molecules generated when the water is electrostatically atomized, the discharge electrode generating a hydrogen water mist in the form of a reduced water mist that contains the molecular hydrogen in the microparticulated water.

When high voltage is applied to the discharge electrode in this structure, the discharge electrode generates an electric field, thereby electrostatically atomizing water supplied from the water supply member and producing water in a microparticulated state. In addition, molecular hydrogen is produced by the chemical reaction of the discharge electrode with nitric acid molecules produced when a portion of the electrostatically atomized water incorporates atmospheric nitrogen during the electrostatic atomization of the water. This results in the production of a hydrogen water mist in the form of a mist that contains large amounts of molecular hydrogen in microparticulated water.

As a consequence, a hydrogen water mist containing large amounts of molecular hydrogen can be produced, as a reduced water mist, by the reduced water mist generator from water using a simple structure. This hydrogen water mist can impart an efficient antioxidative effect to all types of target articles, e.g., human skin and hair, food products, metals, and so forth.

The aforementioned discharge electrode is preferably constituted by the metal element having a higher ionization tendency than hydrogen.

Generally, when the metal element constituting the discharge electrode has a higher ionization tendency than that of hydrogen, the metal element is likely to undergo a chemical reaction with the substance containing the hydrogen atom and produce molecular hydrogen.

Thus, a discharge electrode in this configuration can readily undergo a chemical reaction with the nitric acid molecules that are produced when the water is electrostatically atomized, thereby producing molecular hydrogen.

The discharge electrode in the previously described structure is preferably constituted by zinc.

Unlike elements such as aluminum (Al), zinc does not produce a nonconductor when it undergoes chemical reaction with the nitric acid molecule. As a consequence, such a configuration can effectively prevent the production of a nonconductor when the discharge electrode undergoes chemical reaction with the nitric acid molecule and can thus effectively prevent the attachment of nonconductor to the discharge electrode. As a result, molecular hydrogen—the outcome of the chemical reaction—can be effectively produced at the discharge electrode because the attachment of impurity that would interfere with the chemical reaction between the discharge electrode and the nitric acid molecule is prevented.

The discharge electrode in the previously described structure desirably has a shape that is tapered toward the tip.

The electric field produced at the tip of the discharge electrode in this configuration has a high field density due to the tapered shape of the tip, which results in the production of a stable Taylor cone.

The discharge electrode in the previously described structure is desirably provided with a capillary conduit that draws the water supplied by the water supply member up to the tip of the discharge electrode.

The capillary conduit in such a configuration draws the water supplied by the water supply member up to the discharge electrode tip by capillary phenomena. This enables feed of the condensed water to the tip of the discharge electrode without the use of a pumping means such as a pump.

The discharge electrode in the previously described structure is desirably provided with an OH radical removal member that removes the OH radicals that are generated during the electrostatic atomization of water.

Because in such a configuration the OH radical removal member removes the OH radicals with their oxidative activity, a hydrogen water mist can then be produced that has a very low OH radical content, and thereby more efficiently imparting an antioxidative effect to target articles.

The OH radical removal member in the previously described structure is desirably constructed of a stainless material in mesh form. And the OH radical removal member in the previously described structure is also desirably constructed of a stainless material configured as a honeycomb structure comprising the aggregation of a plurality of cavity-containing hexagonal cylinders.

An OH radical removal member having any of these configurations can secure a large contact surface for contacting the OH radicals that are to be removed. In particular, an OH radical removal member constructed of a stainless material executed as a honeycomb structure comprising the aggregation of a plurality of cavity-containing hexagonal cylinders secures an even larger contact surface for contacting the OH radicals that are to be removed.

Since the reduced water mist generator is then able to remove much of the large OH radical population, a reduced water mist can be produced that has a very low OH radical content, and thereby more efficiently imparting an antioxidative effect to target articles.

The previously described structure is also desirably provided with a counterelectrode disposed to form a pair with the discharge electrode and the OH radical removal member in the previously described structure is desirably disposed downstream the counterelectrode along the direction of OH radical production.

Because the counterelectrode is disposed in this configuration to form a pair with the discharge electrode, the application of high voltage to the discharge electrode and counterelectrode results in the production of Coulombic force between the counterelectrode and the water supplied to the discharge electrode.

As a consequence, the reduced water mist generator can convert the water supplied to the discharge electrode into microparticulated water by bringing about an efficient electrostatic atomization due to the Coulombic force generated between the counterelectrode and the water supplied to the discharge electrode. When electrostatic atomization can be carried out efficiently, the amount of the water electrostatic atomized is increased, and because of this the amount of water that forms the nitric acid molecule by the intake of atmospheric molecular nitrogen also undergoes a proportional increase. The reduced water mist generator is therefore able to generate the nitric acid molecule in large amounts. Molecular hydrogen can then be generated in large amounts since the nitric acid molecules generated in large amounts can chemically react with the discharge electrode.

As a result, the reduced water mist generator can produce, as a reduced water mist, a hydrogen water comprising microparticulated water that contains large amounts of molecular hydrogen.

Moreover, because an OH radical removal member is disposed downstream the counterelectrode along the direction of OH radical production, the OH radicals that have passed through the counterelectrode can be efficiently removed.

The previously described structure is also desirably provided with a counterelectrode that is disposed to form a pair with the discharge electrode and that incorporates the aforementioned OH radical removal member downstream from the discharge electrode along the direction of OH radical production.

The incorporation of the OH radical removal member in the counterelectrode in this configuration has the effect of reducing the number of components.

The method of producing a reduced water mist according to another aspect of the present invention comprises: a water supply step of supplying water to a discharge electrode comprising a metal element that produces molecular hydrogen by a chemical reaction with nitric acid molecules; an electrostatic atomization step of applying high voltage to the discharge electrode to generate an electric field and thereby electrostatically atomizing the water supplied to the discharge electrode to produce microparticulated water; and a reduced water mist generation step of producing molecular hydrogen by a chemical reaction between the discharge electrode and the aforementioned nitric acid molecules produced when the water is electrostatically atomized, to thereby produce, as a reduced water mist, a hydrogen water mist containing the molecular hydrogen in the microparticulated water.

According to this method, a hydrogen water mist containing large amounts of molecular hydrogen can be produced, as a reduced water mist, from water by simple and convenient steps comprising the aforementioned water supply step, electrostatic atomization step, and reduced water mist generation step.

The previously described method is desirably also provided with an OH radical removal step of removing the OH radical that is produced when the discharge electrode carries out electrostatic atomization of the water.

Since, according to this implementation, the OH radical with its oxidative activity is removed in the OH radical removal step, a reduced water mist that has a very low OH radical content can be produced and thereby being able to impart an antioxidative effect to target articles even more efficiently.

The invention claimed is:

1. A reduced water mist generator, comprising:
a water supply member that supplies water;
a high voltage application member that applies a high voltage; and
a discharge electrode that is constituted by a metal element that has a higher ionization tendency than hydrogen and produces molecular hydrogen by a chemical reaction with nitric acid molecules, the discharge electrode being provided with an electrostatic atomizing function that, when a high voltage is applied by the high voltage application member while water is supplied by the water supply member, generates an electric field and thereby electrostatically atomizes the water supplied from the water supply member to produce microparticulated water, and also being provided with a hydrogen molecule generating function that produces the molecular hydrogen by a chemical reaction with nitric acid molecules generated when the water is electrostatically atomized, the discharge electrode generating a hydrogen water mist in the form of a reduced water mist that contains the molecular hydrogen in the microparticulated water.

2. The reduced water mist generator according to claim 1, wherein the discharge electrode is constituted by zinc.

3. The reduced water mist generator according to claim 1, wherein the discharge electrode is tapered toward a tip thereof.

4. The reduced water mist generator according to claim 3, wherein the discharge electrode is provided with a capillary conduit that draws the water supplied by the water supply member up to the tip.

5. The reduced water mist generator according to claim 1, wherein the discharge electrode is provided with an OH radical removal member that removes OH radicals that are produced when the water is electrostatically atomized.

6. The reduced water mist generator according to claim 5, wherein the OH radical removal member is formed of a mesh-shaped stainless material.

7. The reduced water mist generator according to claim 5, wherein the OH radical removal member is formed of stainless material configured as a honeycomb structure comprising an aggregation of a plurality of cavity-containing hexagonal cylinders.

8. The reduced water mist generator according to claim 5, further comprising a counterelectrode disposed to form a pair with the discharge electrode, wherein the OH radical removal member is disposed downstream the counterelectrode along a direction of OH radical production.

9. The reduced water mist generator according to claim 2, further comprising a counterelectrode that is disposed to form a pair with the discharge electrode and that has an OH radical removal member downstream the discharge electrode along a direction of OH radical production.

10. A method of producing a reduced water mist, comprising:
a water supply step of supplying water to a discharge electrode comprising a metal element that produces molecular hydrogen by a chemical reaction with nitric acid molecules;
an electrostatic atomization step of applying high voltage to the discharge electrode to generate an electric field and thereby electrostatically atomizing the water supplied to the discharge electrode to produce microparticulated water; and
a reduced water mist generation step of producing the molecular hydrogen by a chemical reaction between the discharge electrode and the nitric acid molecules produced when the water is electrostatically atomized, to thereby produce, as a reduced water mist, a hydrogen water mist containing the molecular hydrogen in the microparticulated water.

11. The method of producing a reduced water mist according to claim 10, further comprising an OH radical removal step of removing the OH radicals produced during the electrostatic atomization of the water by the discharge electrode.

* * * * *